United States Patent
Nakano et al.

(10) Patent No.: US 6,429,562 B2
(45) Date of Patent: Aug. 6, 2002

(54) MOTOR/GENERATOR

(75) Inventors: Masaki Nakano, Yokohama; Minoru Arimitsu, Yokosuka, both of (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 09/731,862

(22) Filed: Dec. 8, 2000

(30) Foreign Application Priority Data

Dec. 10, 1999 (JP) .......................................... 11-351613
Nov. 27, 2000 (JP) ...................................... 2000-358004

(51) Int. Cl.[7] ............................................. H02K 16/00
(52) U.S. Cl. ....................... 310/113; 310/112; 310/180; 310/184
(58) Field of Search ................................. 310/112, 113, 310/114, 179, 180, 184, 254, 261

(56) References Cited

U.S. PATENT DOCUMENTS

| | | | |
|---|---|---|---|
| 4,785,213 A | * 11/1988 | Satake | 310/116 |
| 5,254,894 A | * 10/1993 | Satake et al. | 310/114 |
| 6,049,152 A | 4/2000 | Nakano | 310/114 |

FOREIGN PATENT DOCUMENTS

JP  11-275826  10/1999

* cited by examiner

Primary Examiner—Burton S. Mullins
(74) Attorney, Agent, or Firm—Foley & Lardner

(57) ABSTRACT

A first motor/generator unit (10A comprises a first rotor (42) and a first stator (40) with a plurality of coils. A second motor/generator unit (10B) comprises a second rotor (43) and a second stator (41) with a plurality of coils. By properly determining the number of coils S1, S2 in the stators (40, 41), the number of pairs of magnetic poles P1, P2 in the magnet of the rotors (42, 43), and the number of phases M1, M2 in alternating currents driving the rotors (42, 43), and connecting a coil with a coil number j in a group number i of the first stator (40) with a coil with a coil number i in a group number j of the second stator (41), it is possible to suppress an ineffectual current generated when two motor/generator units (10A, 10B) are independently driven by the same inverter (32).

5 Claims, 10 Drawing Sheets

MOTOR/GENERATOR

FIELD OF THE INVENTION

This invention relates to the driving efficiency of two motor/generators driven independently by single inverter.

BACKGROUND OF THE INVENTION

Tokkai Hei 11-275826 published by the Japanese Patent Office in 1999 discloses a motor/generator which drives a plurality of rotors independently by applying a composite polyphase alternating current to a set of stator coils. The invention disclosed in Tokkai Hei 11-275826 is also disclosed in U.S. patent application Ser. No. 09/275,785 filed on Mar. 25, 1999 before the priority date of this invention and was granted as U.S. Pat. No. 6,049,152 after the priority date of this invention.

In the motor/generator disclosed in Tokkai Hei 11-275826, the composite polyphase alternating current with a fixed angular phase difference is supplied from an inverter to coils of each phase in the stator.

SUMMARY OF THE INVENTION

The research carried out by the present inventors has demonstrated that it is possible to drive two motors independently, if the rotors have a different number of magnetic poles, by connecting coils of the two stators to an inverter in parallel.

However with the above arrangement, the current for driving the rotation of one motor also flows in the coils of the other motor. When the number of magnetic poles in respective rotors is different, the current is actually ineffectual as it does not create a torque in the other motor. This increases copper loss in the motor.

It is therefore an object of this invention to suppress the generation of an ineffectual current generated when two motor/generators are driven independently by a single inverter.

It is a further object of this invention to control an induced electromotive force generated by the rotations of the motor/generator.

In order to achieve the above objects, this invention provides a motor/generator comprising a first motor/generator unit comprising a first rotor provided with a magnet and a first stator provided with a plurality of coils facing the first rotor, and a second motor/generator unit comprising a second rotor provided with a magnet and a second stator provided with a plurality of coils facing the second rotor.

The motor/generator is further configured as follows.

Providing that the number of coils in the first stator is S1, the number of pairs of magnetic poles in the magnet of the first rotor is P1, and the number of phases in a first alternating current which drives the first rotor through the coils of the first stator is M1, the coils of the first stator are divided into groups of the number of K1 satisfying the equation K1=S1/M1. The coils in each group of the first stator are mutually connected by either a Y connection or a delta connection.

Providing that the number of coils in the second stator is S2, the number of pairs of magnetic poles in the magnet of the second rotor is P2, and the number of phases in a second alternating current which drives the second rotor through the coils of the second stator is M2, the coils of the second stator are divided into groups of the number of K2 satisfying the equation K2=S2/M2. The coils in each group of the second stator are mutually connected by either a Y connection or a delta connection.

Providing that the groups of the first stator is numbered from 1 to K1/A, A being a natural number, the coils in each group of the first stator is numbered from 1 to M1, the groups of the second stator is numbered from 1 to K2/B, B being a natural number, the coils in each group of the second stator is numbered from 1 to M2, and i and j are natural numbers, a coil with a coil number j in a group number i of the first stator and a coil of a coil number i in a group number j of the second stator are connected to each other.

The details as well as other features and advantages of this invention are set forth in the remainder of the specification and are shown in the accompanying drawings.

DESCRIPTION OF THE PREFERRED EMBODIMENT

Figure 1A:
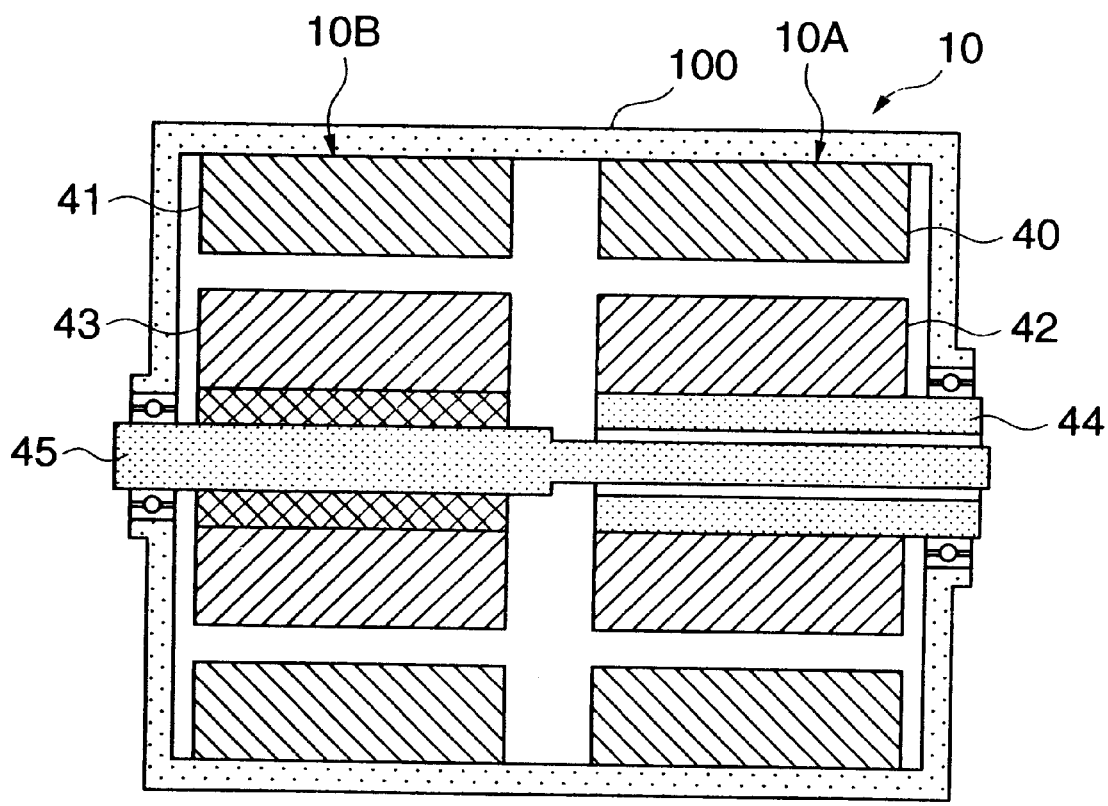
FIGS. 1A and 1B are schematic diagrams of motor/generators according to this invention.

Referring to FIG. 1A of the drawings, a motor/generator 10 comprises a right motor/generator unit 10A and a left motor/generator unit 10B housed in a single case 100. The right motor/generator unit 10A is provided with a right rotor 42, a right stator 40 and a right rotation shaft 44. The left motor/generator unit 10B is provided with a left rotor 43, a left stator 41 and a left rotation shaft 45.

The right rotation shaft 44 and the left rotation shaft 45 are disposed co-axially so that the right rotation shaft 44 overlaps with a part of the left rotation shaft 45. The right rotor 42 is provided with magnets having four pairs of magnetic poles.

The left rotor 43 is provided with magnets having three pairs of magnetic poles. Herein a pair of magnetic poles denotes a pair of an N pole and S pole. Each of the right stator 40 and the left stator 41 is provided with twelve coils in order to form a rotating magnetic field. However the number of pairs of magnetic poles of the rotating magnetic field in the right motor/generator unit 10A differs from the number of pairs of poles of the rotating magnetic field in the left motor/generator unit 10B.

The right stator 40 is so arranged that a magnetic field having four pairs of magnetic poles is formed by supplying a three-phase alternating current to the coils. The left rotor 41 is so arranged that a magnetic field having three pairs of magnetic poles is formed by supplying a four-phase alternating current to the coils.

Figure 1B:
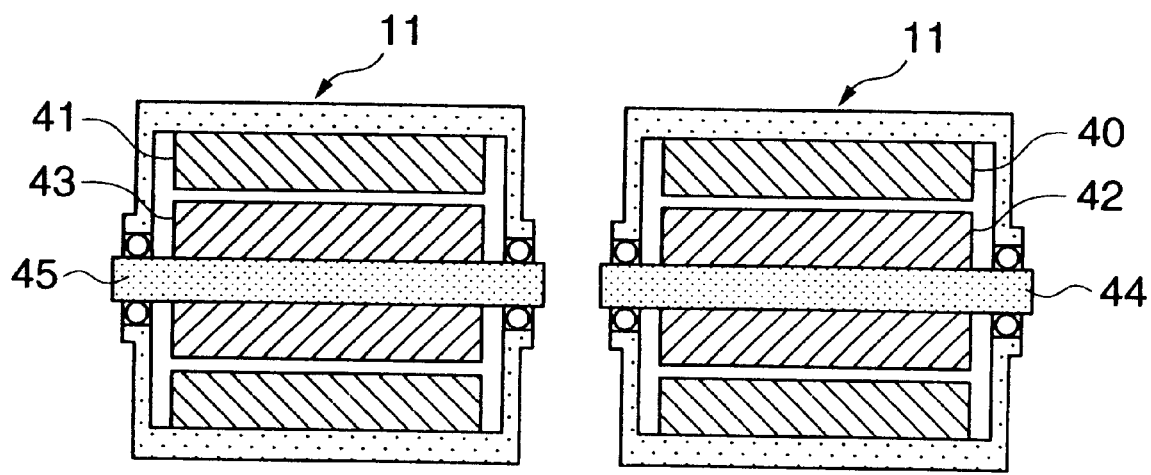

Referring to FIG. 1B, motor/generators 11 correspond to the motor/generator 10 separated into two independent motor/generators. Each motor/generator 11 is provided with a rotor 42(43), a stator 41(42) and a rotation 44(45). The structure of the rotor 42(43) and the stator 40(41) is identical to those of the motor/generator 10.

Figure 2A:
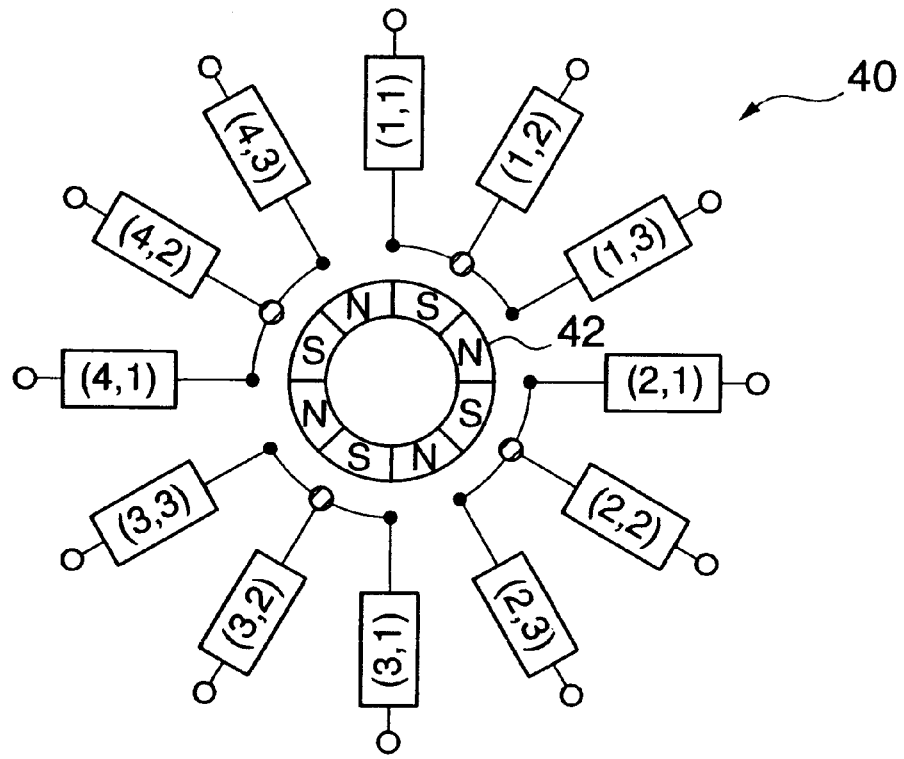
FIGS. 2A and 2B are schematic diagrams of rotors and stators of the motor/generators.
Figure 2B:
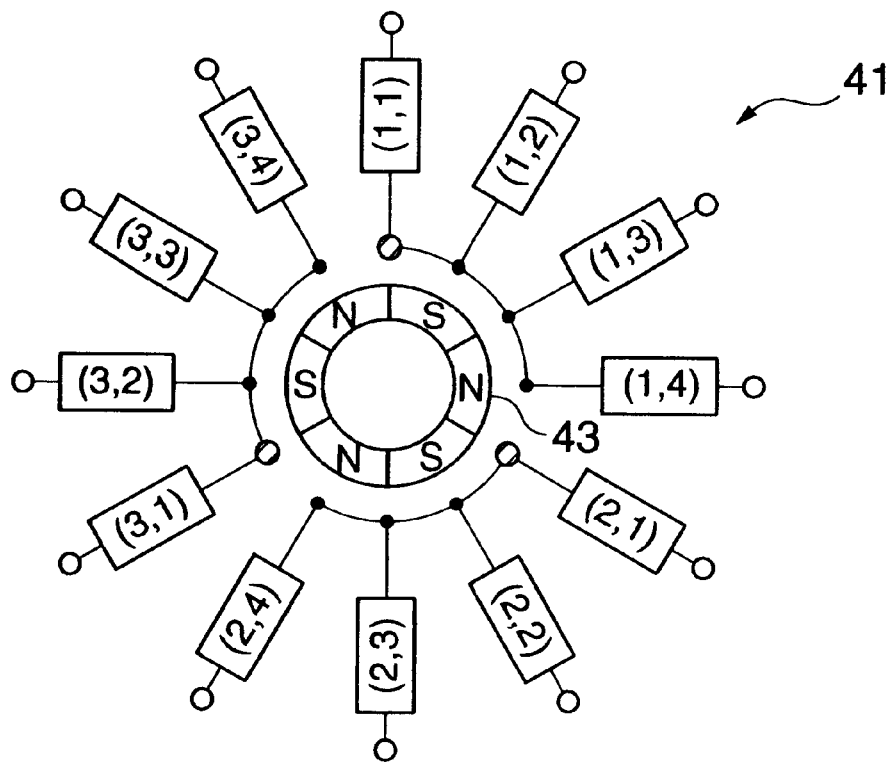

Although this embodiment may be applied to the motor/generator 10 or a pair of motor/generators 11, the following description will describe an application to the motor/generator 10. Referring now to FIGS. 2A and 2B, the right rotor 42 is provided with magnets having four pairs of magnetic poles. The left rotor 43 is provided with a magnet having three pairs of magnetic poles. Here the term "pairs of magnetic poles" refers to pairs of N poles and S poles.

The right stator 40 and the left stator 41 are respectively provided with twelve coils in order to form a rotating magnetic field. However the number of pairs of magnetic poles in the resultant rotating magnetic field in the right motor/generator unit 10A differs from the number in the left motor/generator unit 10B. The right stator 40 of the right motor/generator unit 10A forms a rotating magnetic field with four pairs of magnetic poles by supplying a three-phase alternating current. The left stator 41 of the left motor/generator unit 10B forms a rotating magnetic field with three pairs of magnetic poles by supplying a four-phase alternating current. The number of pairs of magnetic poles in the rotating magnetic field formed by the stator 40(41) in order to rotate the rotor 42(43) is equal to the number of pairs of magnetic poles of the rotor 42(43).

The coils of the stator 40 are mutually connected as shown in FIG. 2A. In the figure, the number of a coil is expressed by (i, j). i is a group number. j is a number expressing the coil order in the group or the phase number in a group. In the stator 40, there are four groups of coils and each group is constituted by three coils.

In the same manner, coils of the stator 41 are mutually connected as shown in FIG. 2B. In the figure, the number of a coil is expressed by (i, j) in the same manner as the stator 40. In the stator 41, there are three groups of coils and each group is constituted by four coils.

In the stator 40, each end of the three adjacent coils in the same group forms a neutral point connected by a Y connection. In the stator 41, each end of the four adjacent coils in the same group forms a neutral point connected by a Y connection.

Figure 3:
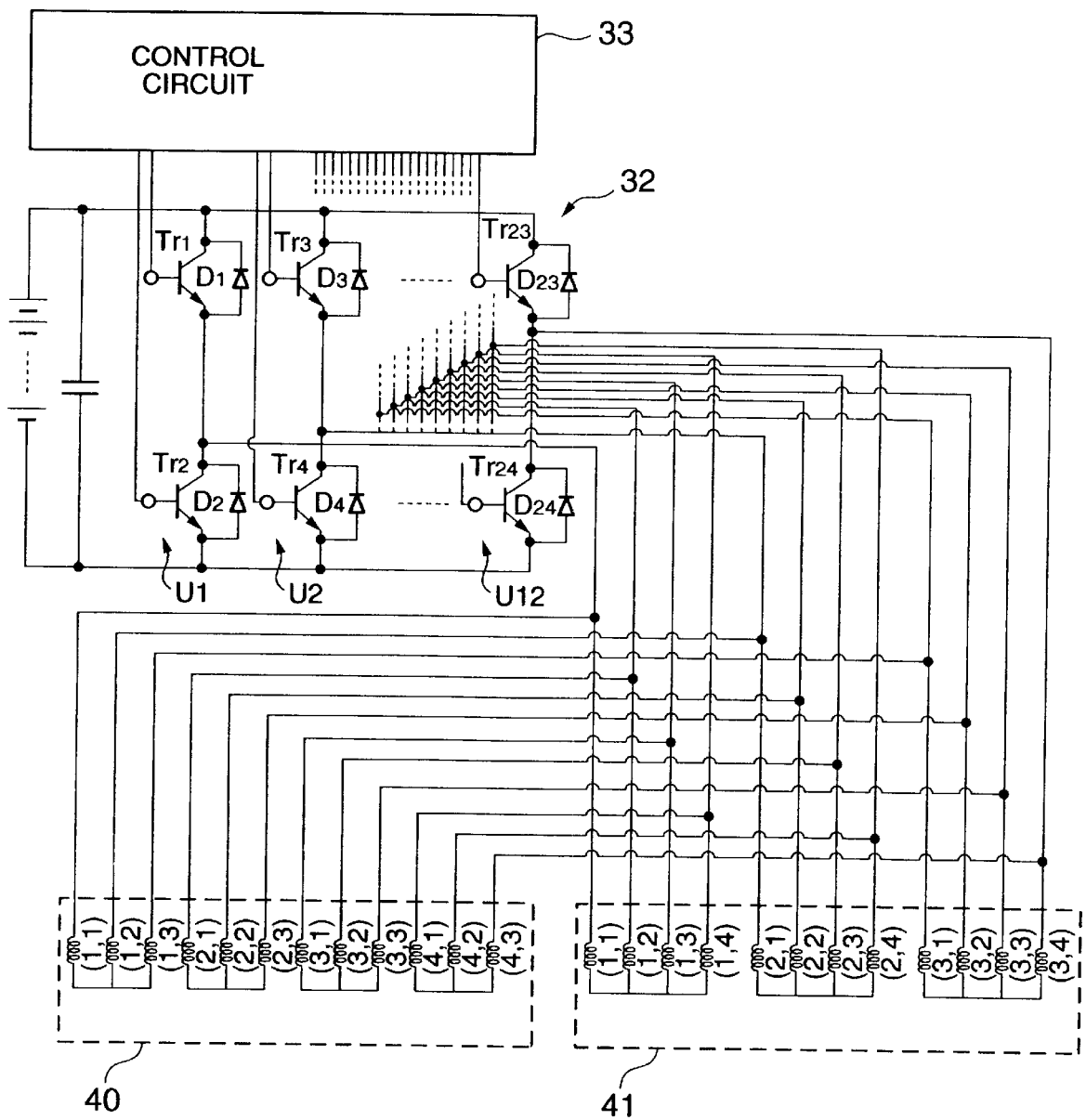
FIG. 3 is a drive circuit diagram of the motor/generators.

Referring now to FIG. 3, an alternating current from the inverter 32 is supplied to the respective terminal of each coil positioned on the opposite side to the neutral point. The inverter is provided with twelve inverter units U1–U12. Each unit comprises two transistors and two diodes. In total, the inverter 32 comprises twenty four transistors Tr1–Tr24 and twenty four diodes D1–D24. Twelve types of affirmative and negative pulse modulation signals (hereafter referred to as a PWM signal) from a control circuit 33 are input into the base of the transistors Tr1–Tr24. A twelve -phase alternating current can be output in response to the PWM signal from each inverter unit U1–U12 of the inverter 32.

The coils of the stator 40 and 41 and the inverter 32 are connected as shown in FIG. 3.

A coil (x, y) of the stator 40 and a coil (y, x) of the stator 41 are connected to the same inverter unit U1–U12 of the inverter 32. That is to say, a coil (1, 1) of the stator 40 and a coil (1, 1) of the stator 41 are connected to the inverter unit U1. A coil (1, 2) of the stator 40 and a coil (2, 1) of the stator 41 are connected to the inverter unit U2. A coil (1, 3) of the stator 40 and a coil (3, 1) of the stator 41 are connected to the inverter unit U3. The other coils are connected to the inverter units U4–U12 in the same manner. Thus the coil (4, 3) of the stator 40 and the coil (3, 4) of the stator 41 are connected to the inverter unit U12.

The control of the output current of the inverter 32 will be described below.

When the right motor/generator unit 10A is driven, in the stator 40, an equiphase current is supplied to the four coils (i,1), an equiphase current is supplied to the four coils (i, 2), and an equiphase current is supplied to the four coils (i, 3). In this manner, the stator 40 forms a rotating magnet field provided with four pairs of magnetic poles by supplying respective three-phase alternating currents to the four groups.

The same current is also applied to the coil (i, j) of the stator 41 connected to each inverter unit U1–U12. However in the stator 41, an equiphase current is applied to the four coils (1, j) in the first group, an equiphase current is applied to the four coils (2, j) in the second group and an equiphase current is applied to the four coils (3, j) in the third group. Thus a current does not flow in the coil (i, j) of the stator 41.

When the left motor/generator unit 10B is driven, in the stator 41, an equiphase current is supplied to the three coils (i,1), an equiphase current is supplied to the three coils (i, 2), an equiphase current is supplied to the three coils (i, 3) and an equiphase current is supplied to the three coils (i, 4). In this manner, the stator 41 forms a rotating magnet field provided with three pairs of magnetic poles by supplying four-phase alternating currents to the three groups.

The same current is also applied to the stator 40 connected to each inverter unit U1–U12. However in the stator 40, an equiphase current is applied to the three coils (1, j) in the first group, an equiphase current is applied to the three coils (2, j1) in the second group, an equiphase current is applied to the four coils (3, j) in the third group and an equiphase current is applied to the four coils (4, j) in the fourth group. Thus a current does not flow in the coil (i, j) of the stator 40.

When the right motor/generator unit 10A and the left motor/generator unit 10B are driven at the same time, a composite twelve-phase current combining the current flowing when the respective motor/generators are driven is supplied to each pair of coils, i.e., a coil (x, y) of the stator 40 and a coil (y, x) of the stator 41, from each inverter unit U1–U12 of the inverter 32. As a result, the same current is applied to each pair of coils, but a current component to drive the rotor 43 does not flow in the coils of the stator 40 which drives the rotor 42 and a current component to drive the rotor 42 does not flow in the coils of the stator 41 which drives the rotor 43.

Thus in the motor/generator 10 the current supplied to the stator 40(41) to drive one of the rotors 42(43) does not flow at all in the coils of the stator 41(40) which drives the other rotor 43(42). As a result, an ineffectual current is not generated.

Although the motor/generator 10 has been described above, the same wiring can be applied to the stators 40 and 41 of two independent motor/generators 11.

Figure 4A:
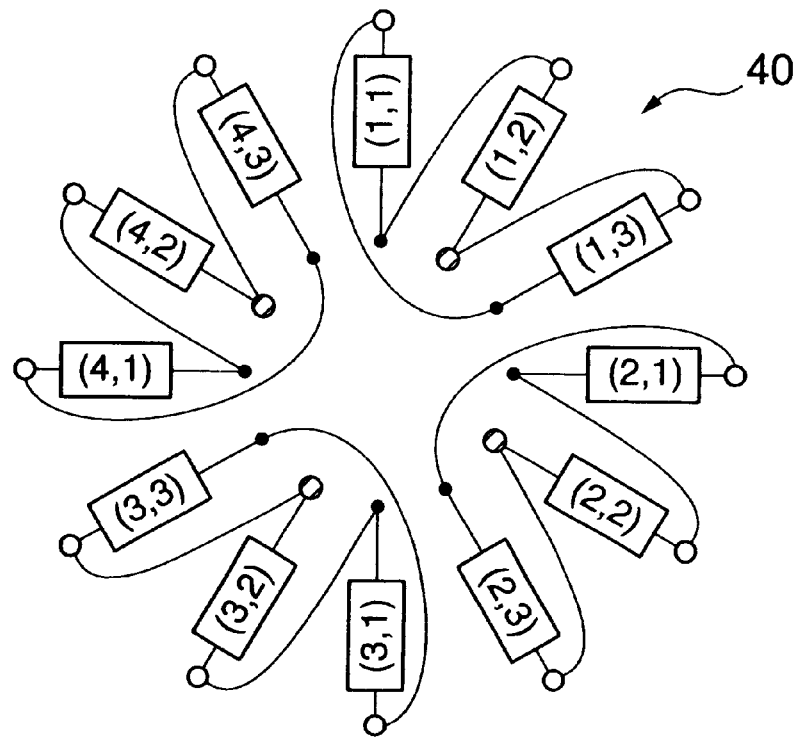
FIGS. 4A and 4B are similar to FIGS. 2A and 2B, but showing a variation of the connecting structure of coils in the stators.
Figure 4B:
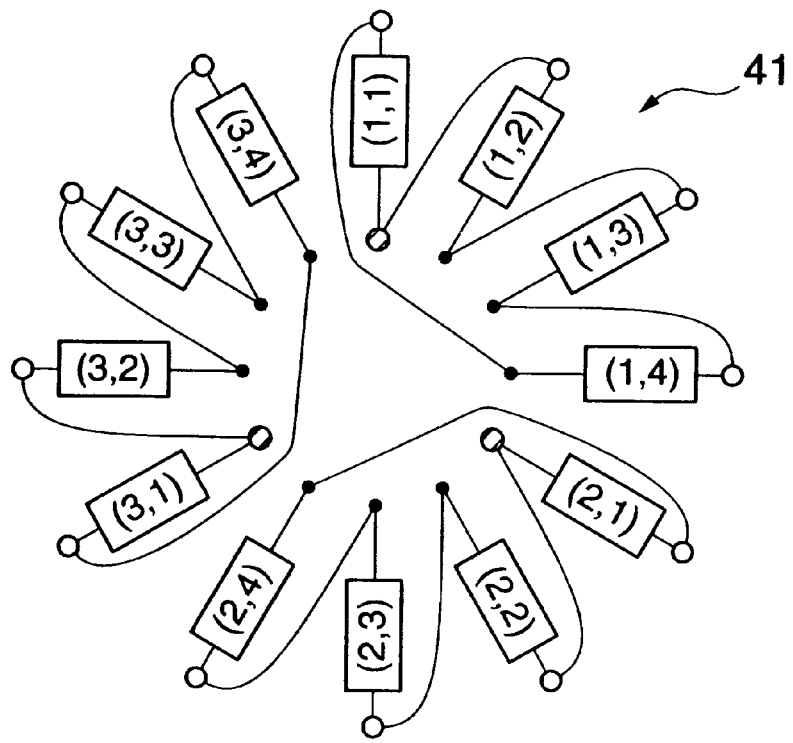

In this embodiment, the coils of the stators 40 and 41 in the same group are connected by a Y connection. However as shown in FIGS. 4A and 4B, it is possible to connect the coils in the same group with a delta connection which is equivalent to a Y connection.

In this embodiment, the number of coils S1(S2) of the stator 40(41) of the right motor/generator unit 10A (left motor/generator unit 10B), the number of pairs of magnetic poles P1(P2) of the rotor 42(43) and the phase number M1(M2) of the alternating current supplied to the coils (i, j) of the stator 40(41) are summarized as follows.

right motor/generator unit 10A: S1=12, P1=4, M1=3
left motor/generator unit 10B: S1=12, P1=3, M2=4

Figure 5A:
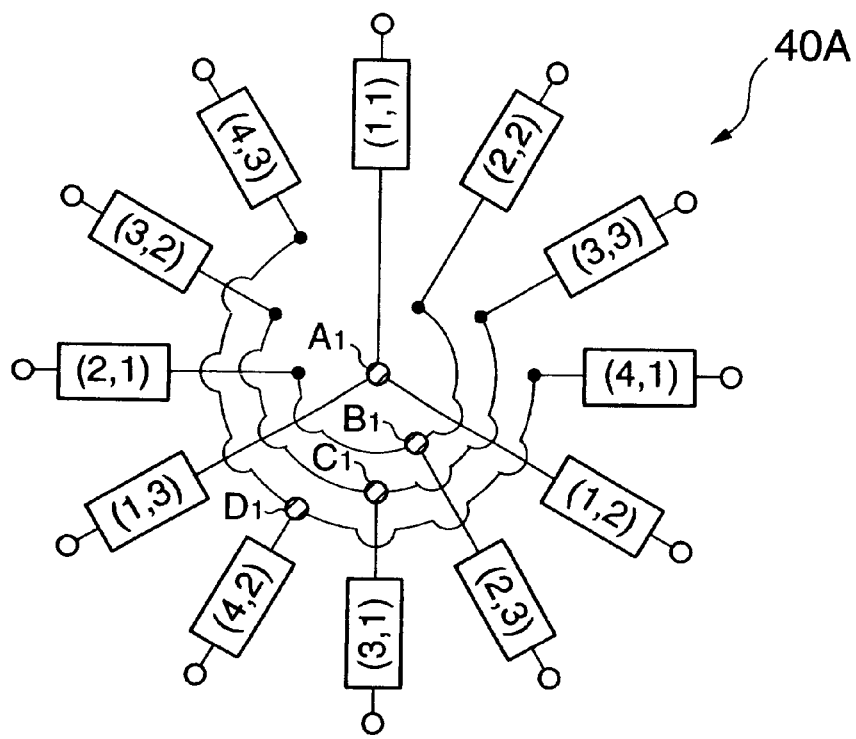
FIGS. 5A and 5B are schematic diagrams of the stators according to a second embodiment of this invention.
Figure 5B:
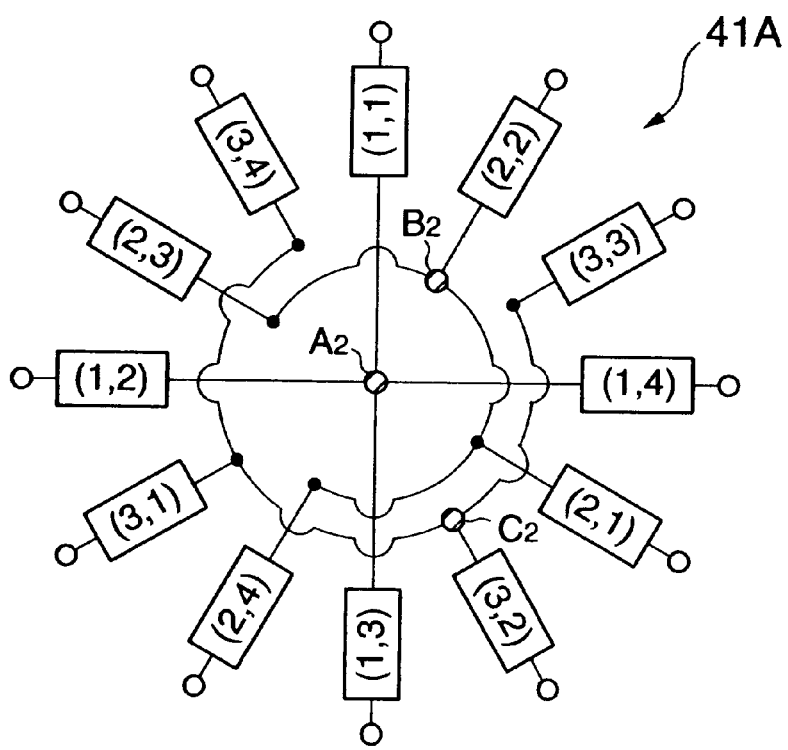

A second embodiment of this invention will be described with reference to FIGS. 5A and 5B.

In the first embodiment, the groups were constituted by connecting adjacent coils with a Y connection. In this embodiment, groups are constituted by connecting coils disposed at a fixed angular interval with a Y connection.

Stators 40A and 41A in this embodiment are also provided with twelve coils. The stator 40A forms a rotating magnetic field provided with four pairs of magnetic poles due to the supply of a three-phase alternating current. The stator 41A forms a rotating magnetic field provided with three pairs of magnetic poles due to the supply of a four-phase alternating current.

This embodiment differs from the first embodiment with respect to the connection to the neutral point. In the stator 40A of this embodiment, a single group is formed by connecting three coils disposed at 120-degree intervals to the neutral point by a Y connection. In the stator 41A of this embodiment, a single group is formed by connecting four coils disposed at 90-degree intervals to the neutral point by a Y connection. The structure of the drive circuit is the same as that in the first embodiment.

In this embodiment, when the right motor /generator unit 10A is driven, in the stator 40A, an equiphase current is supplied to the four coils (i, 1), an equiphase current is supplied to the four coils (i, 2), and an equiphase current is supplied to the four coils (i, 3). As a result, in the stator 41A, an equiphase current is applied to the four coils (1, j) in the first group, an equiphase current is applied to the four coils (2, j) in the second group and an equiphase current is applied to the four coils (3, j) in the third group. Thus a current does not flow in the coils (i, j) of the stator 41A.

On the other hand, when the left motor/generator unit 10B is driven, in the stator 41A, an equiphase current is supplied to the three coils (i,1), an equiphase current is supplied to the three coils (i, 2), an equiphase current is supplied to the three coils (i, 3) and an equiphase current is supplied to the three coils (i, 4). As a result, in the stator 40A, an equiphase current is applied to the three coils (1, j) in the first group, an equiphase current is applied to the three coils (2, j) in the second group, an equiphase current is applied to the four coils (3, j) in the third group and an equiphase current is applied to the four coils (4, j) in the fourth group. Thus a current does not flow in the coil (i, j) of the stator 40A.

Figure 6A:
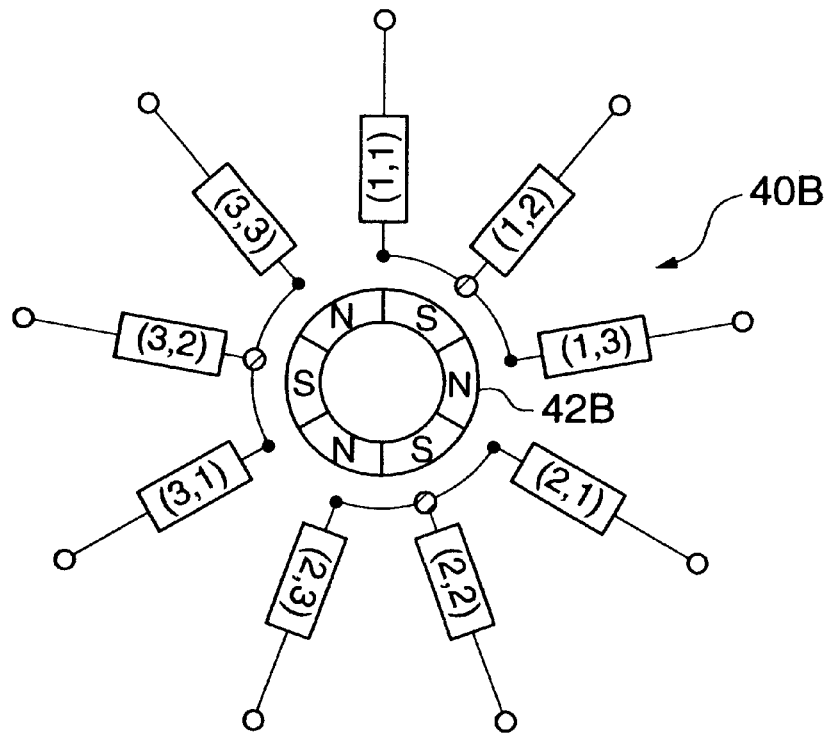
FIGS. 6A and 6B are schematic diagrams of stators and rotors according to a third embodiment of this invention.
Figure 6B:
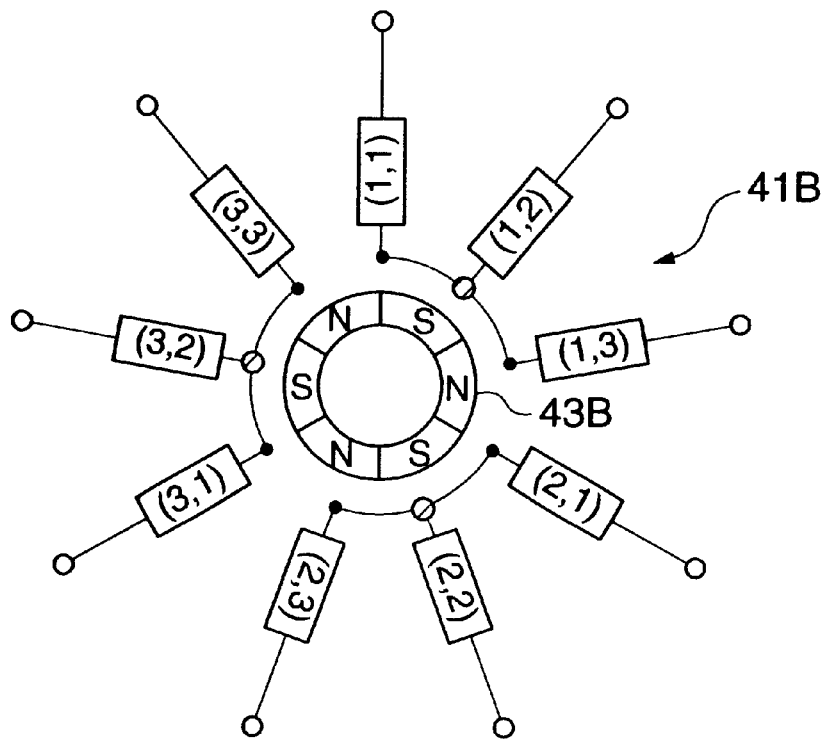

Thus this embodiment also prevents the generation of an ineffectual current. A third embodiment of this invention will be described with reference to FIGS. 6A and 6B and FIG. 7. The stators 40B and 41B in this embodiment are respectively provided with nine coils (i, j). The rotor 42B and 43B is provided with magnets having three pairs of magnetic poles. In the stator 40B, three adjacent coils are connected with a Y connection to provide a neutral point. In the stator 41B, three adjacent coils are connected with a Y connection in the same manner to provide a neutral point. Thus the coils of the stators 40B and 41B are respectively divided into three groups.

Figure 7:
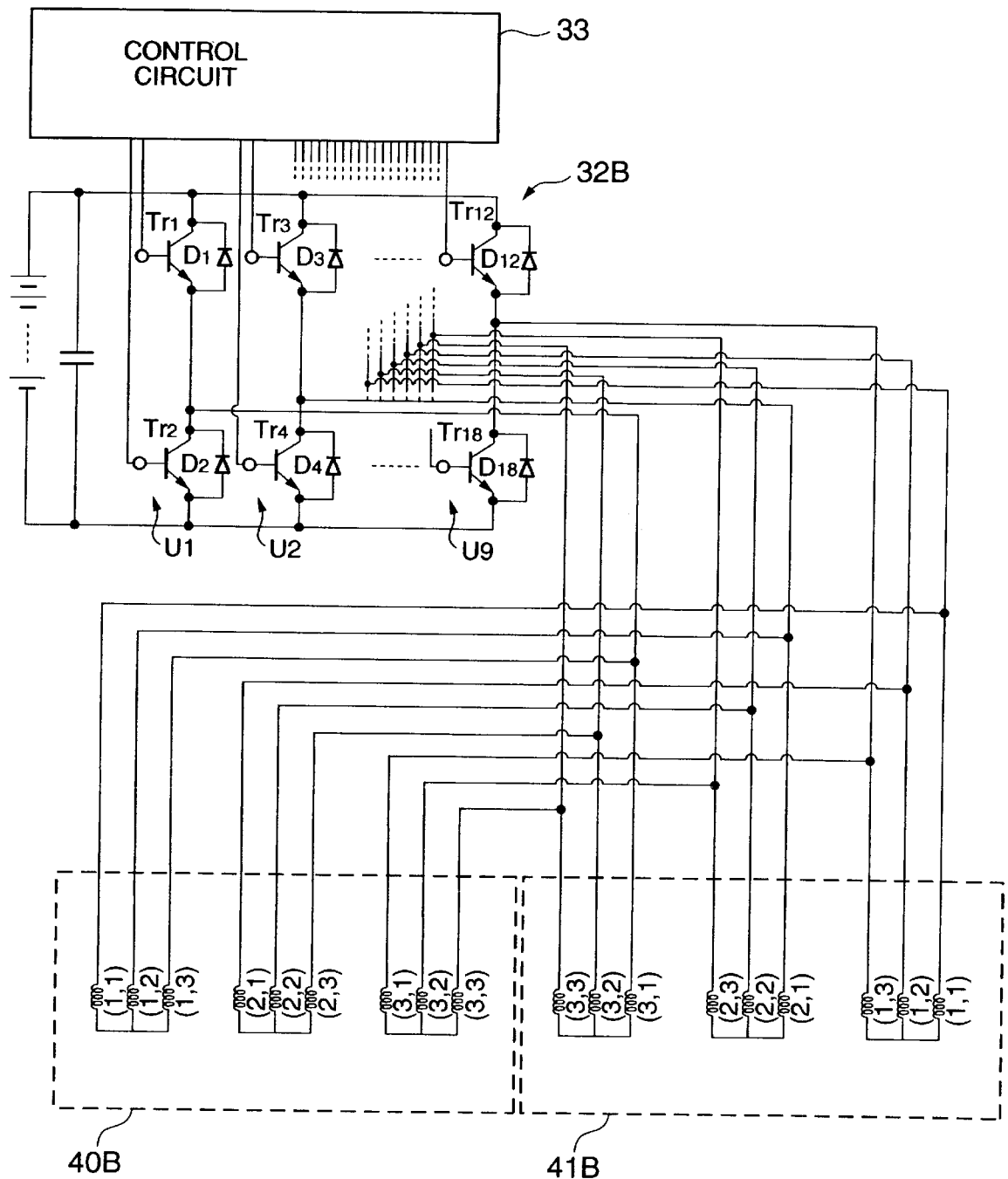
FIG. 7 shows a drive circuit diagram of motor/generators according to the third embodiment of this invention.

An inverter 32B to supply composite alternating current to the coils of the stator 40B and 41B comprises nine inverter units U1–U9. The inverter 32B and the coils of the stators 40B and 41B are connected as shown in FIG. 7.

A coil (x, y) of the stator 40B and a coil (y, x) of the stator 41B are connected to the same inverter unit U1–U9. That is to say, a coil (1, 1) of the stator 40B and a coil (1, 1) of the stator 41B are connected to the inverter unit U3. A coil (1, 2) of the stator 40B and a coil (2, 1) of the stator 41B are connected to the inverter unit U2. A coil (1, 3) of the stator 40B and a coil (3, 1) of the stator 41B are connected to the inverter unit U1. A coil (2, 1) of the stator 40B and a coil (1, 2) of the stator 41B are connected to the inverter unit U6. A coil (2, 2) of the stator 40B and a coil (2, 2) of the stator 41B are connected to the inverter unit U5. A coil (2, 3) of the stator 40B and a coil (3, 2) of the stator 41B are connected to the inverter unit U4. A coil (3,1) of the stator 40B and a coil (1, 3) of the stator 41B are connected to the inverter unit U9. A coil (3,2) of the stator 40B and a coil (2, 3) of the stator 41B are connected to the inverter unit U8. A coil (3,3) of the stator 40B and a coil (3, 3) of the stator 41B are connected to the inverter unit U7.

In this embodiment, when the right motor/generator unit 10A is driven, a three-phase alternating current is supplied to three coils in the same group of the stator 40B. As a result, in the stator 40B, an equiphase current is supplied to the three coils (i, 1), an equiphase current is supplied to the three coils (i, 2), and an equiphase current is supplied to the three coils (i, 3). Thus the stator 40 forms a rotating magnetic field provided with three pairs of magnetic poles.

The same current is also applied to the coil (i, j) of the stator 41B connected to each inverter unit U1–U9. However in the stator 41 B, an equiphase current is applied to the three coils (1,j) in the first group, an equiphase current is applied to the three coils (2,j) in the second group and an equiphase current is applied to the three coils (3, j) in the third group. Thus a current does not flow in the coils (ij) of the stator 41B.

When the left motor/generator unit 10B is driven, a three-phase alternating current is supplied to three coils in the same group of the stator 41B. As a result, in the stator 41B, an equiphase current is supplied to the three coils (i, 1), an equiphase current is supplied to the three coils (i, 2), and an equiphase current is supplied to the three coils (i, 3). Thus the stator 41B forms a rotating magnetic field provided with three pairs of magnetic poles.

The same current is also applied to the coil of the stator 40B connected to each inverter unit U1–U9. However in the stator 40B, an equiphase current is applied to the three coils (1,j) in the first group, an equiphase current is applied to the three coils (2,j) in the second group and an equiphase current is applied to the three coils (3, j) in the third group. Thus a current does not flow in the coils (i,j) of the stator 40B.

Thus in the motor/generator 10(11), the current supplied to the stator 40B(41B) to drive one of the rotors 42(43) does not flow at all in the coils of the stator 41B(40B) which drives the other rotor 43(42). As a result, an ineffectual current is not generated.

In this embodiment, the coils are connected by a Y connection. However it is possible to connect the coils with a delta connection which is equivalent to a Y connection.

In this embodiment, the number of coils S1(S2) of the stator 40B(41B) of the right motor/generator unit 10A (left motor /generator unit 10B), the number of pairs of magnetic poles P1(P2) of the rotor 42(43) and the phase number M1(M2) of the alternating current supplied to the coils (i, j) of the stator 40B(41B) are summarized as follows.

right motor/generator unit 10A: S1=9, P1=3, M1=3
left motor/generator unit 10B: S1=9, P1=3, M2=3

Figure 8A:
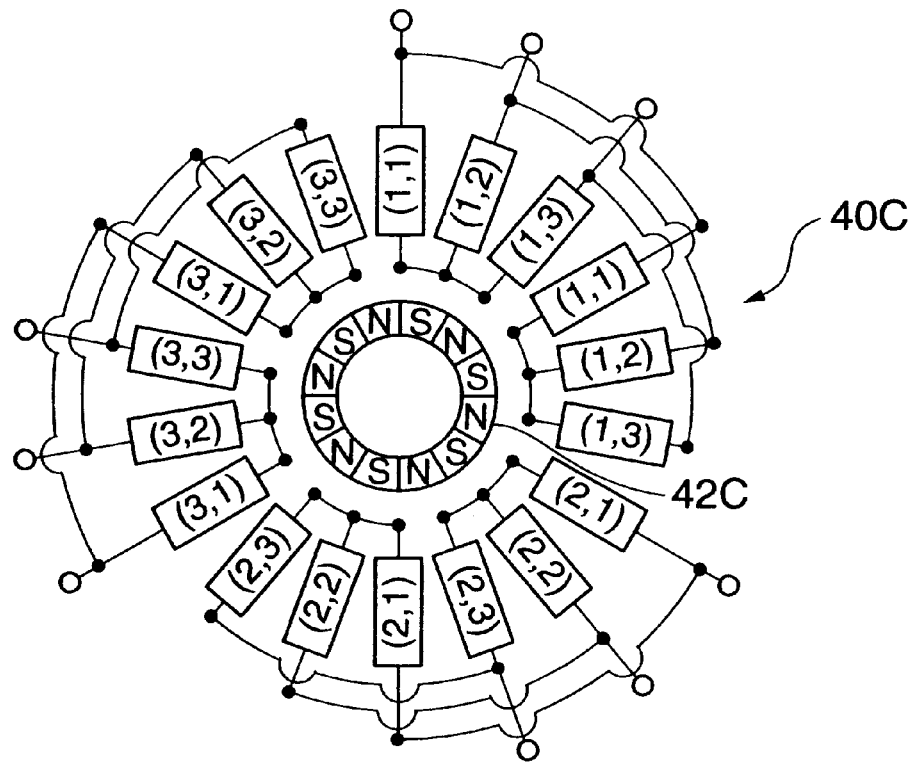
FIGS. 8A and 8B are schematic diagrams of stators and rotors according to a fourth embodiment of this invention.
Figure 8B:
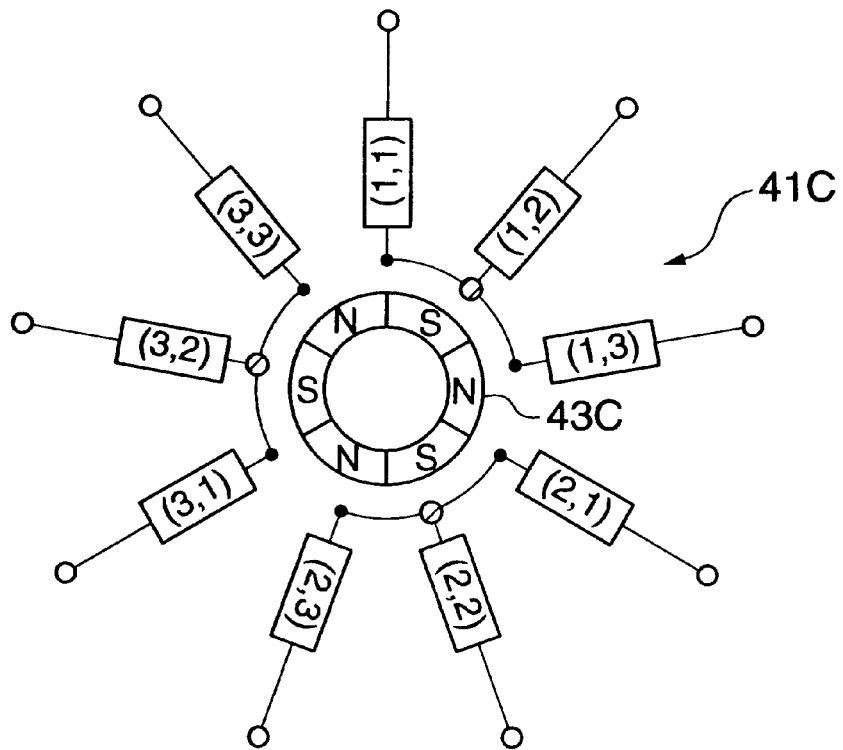

A fourth embodiment of this invention will be described with reference to FIGS. 8A and 8B.

The stator 40C according to this embodiment is provided with eighteen coils (i, j). The rotor 42C is provided with a magnet having six pairs of magnetic poles. The structure of the control circuit, the inverter and the stator 41C and rotor 43C is the same as that described with reference to the third embodiment.

Three adjacent coils of the stator 40C are connected with a Y connection to provide a neutral point. Thus six neutral points are provided in the stator 40C.

Further, the coils of two adjacent groups are connected in parallel to the inverter.

For example, two coils (1, 1) of the first group and the second group are connected to the inverter unit U3 of the inverter 32B of the third embodiment. The coil (1, 1) of the stator 41C is also connected to the inverter unit U3.

In this manner, two coils (x, y) of the stator 40C and one coil (y, x) of the stator 41C are connected to the same inverter unit U1–U9.

In this embodiment, when the right motor/generator unit 10A is driven, a three-phase alternating current is supplied to six coils (i,1) of the first and second groups, to six coils (i,2) of the third and fourth groups, and to six coils (i,3) of the fifth and sixth groups in the stator 40C. As a result, in the stator 40C, an equiphase current is supplied to the six coils (i, 1), an equiphase current is supplied to the six coils (i, 2) and an equiphase current is supplied to the six coils (i, 3). Thus the stator 40C forms a rotating magnetic field provided with six pairs of magnetic poles.

In this case, the same current is applied to the coils of the stator 41C which is connected to each inverter unit U1–U9. However in the stator 41C, an equiphase current is applied to the three coils (1, j) of the first group, an equiphase current is applied to the three coils (2, j) of the second group, and an equiphase current is applied to the three coils (3, j) of the third group. Thus a current does not flow in the coil (i, j) of the stator 41C.

On the other hand, when the left motor/generator unit 10B is driven, in the stator 41C, a three-phase alternating current is supplied to the three coils in the same group of the stator 41C. As a result in the stator 41C, an equiphase current is supplied to the three coils (i,1), an equiphase current is supplied to the three coils (i, 2), and the same phase is supplied to the three coils (i, 3). Thus the stator 41B forms a rotating magnetic field provided with three pairs of magnetic poles.

The same current is applied to the coils of the stator 40C connected to each inverter unit U1–U9. However in the stator 40C, an equiphase current is applied to the six coils (1, j) of the first and second groups, an equiphase current is applied to the six coils (2, j) of the third and fourth groups, and an equiphase current is applied to the six coils (3, j) of the fifth and sixth groups. Thus a current does not flow in the coil (i, j) of the stator 40C.

Thus in the motor/generator 10(11), the current supplied to the stator 40C(41C) to drive one of the rotors 42C(43C) does not flow at all in the coils of the stator 41C(40C) which drives the other rotor 43C(42C). As a result, an ineffectual current is not generated.

In this embodiment, the coils are connected by a Y connection. However it is possible to connect the coils with a delta connection which is equivalent to a Y connection.

In this embodiment, the number of coils S1(S2) of the stator 40C(41C) of the right motor/generator unit 10A (left motor/generator unit 10B), the number of pairs of magnetic poles P1(P2) of the rotor 42C(43C) and the phase number M1(M2) of the alternating current supplied to the coils (i, j) of the stator 40C(41C) are summarized as follows.

right motor/generator unit 10A: S1=18, P1=6, M1=3
left motor/generator unit 10B: S1=9, P1=3, M2=3

A fifth embodiment of this invention will be described with reference to FIGS. 9 to 11 and FIGS. 12A and 12B.

Figure 9:
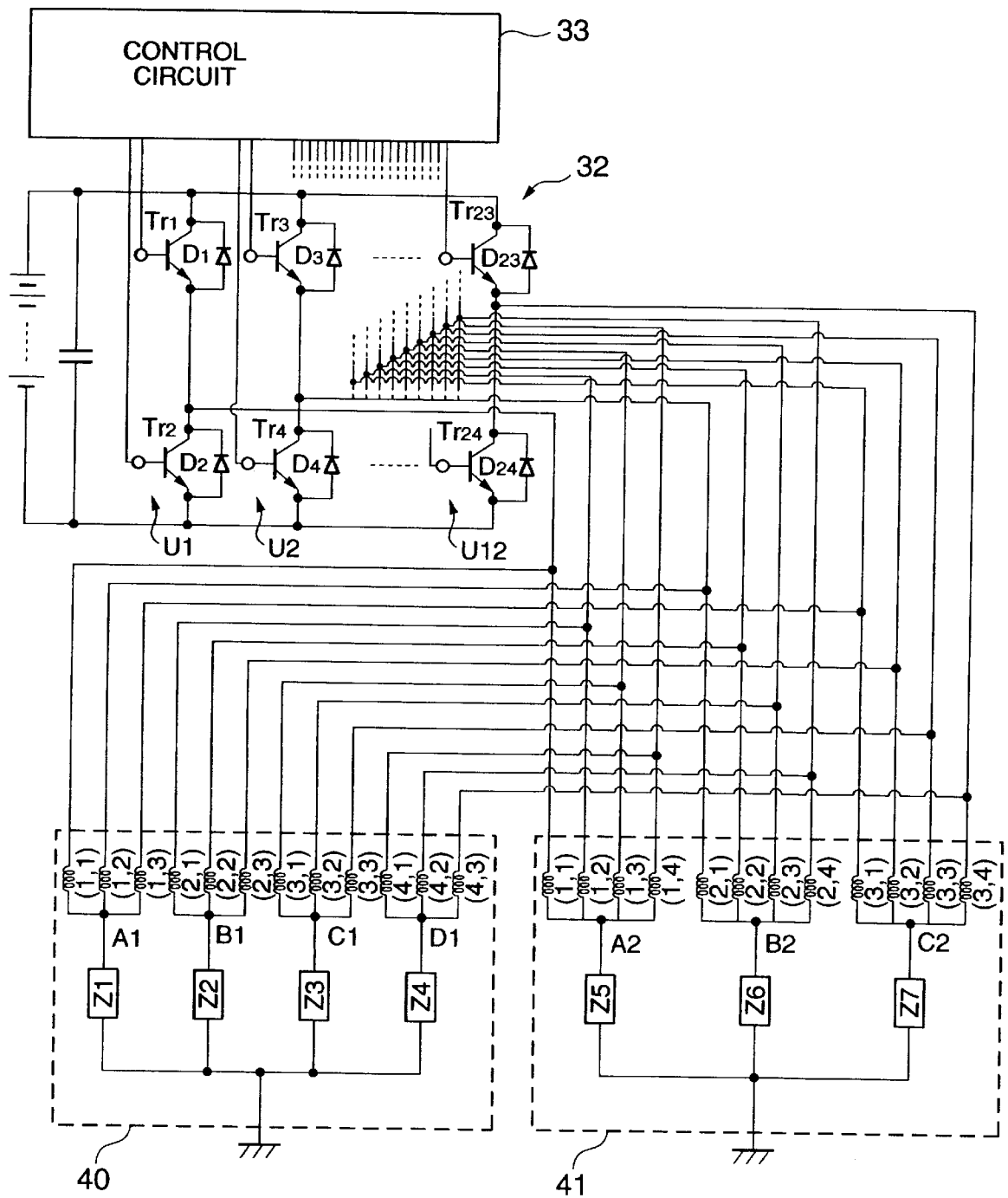
FIG. 9 shows a drive circuit diagram of motor/generators according to a fifth embodiment of this invention.

In this embodiment, neutral points A1, B1, C1, D1 of the coils in the first to fourth groups of the first stator 40 of the second embodiment are earthed through respective impedance components Z1–Z4 as shown in FIG. 9. Furthermore neutral points A2, B2, C2 of the coils in the first to third groups of the second stator 41 of the second embodiment are earthed through respective impedance components Z5–Z7.

In other respects, the fifth embodiment is the same as the second embodiment.

Figure 10:
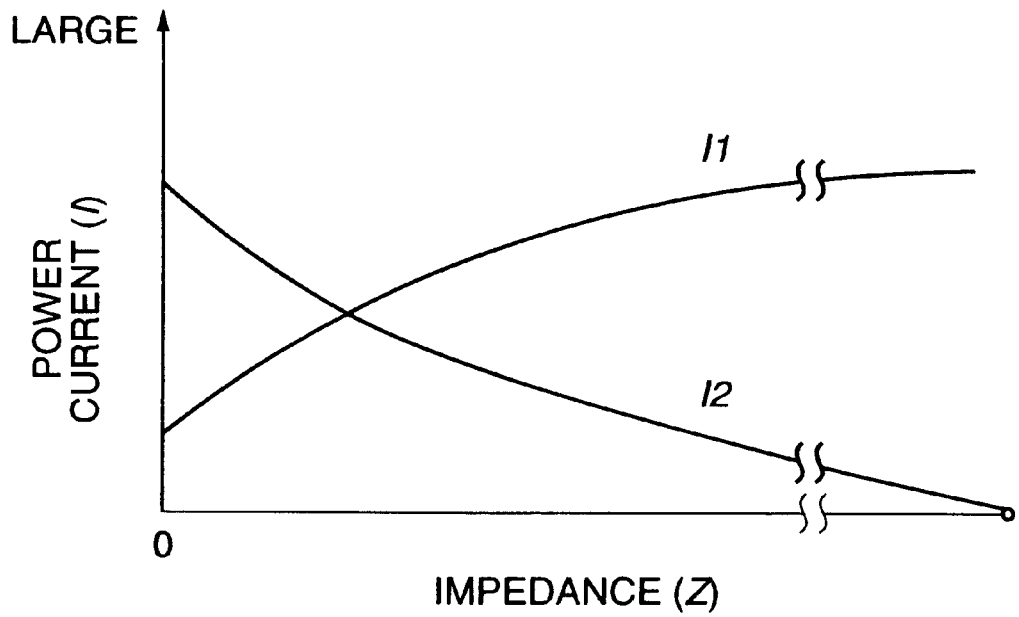
FIG. 10 is a diagram showing a relationship between an impedance Z of an impedance component and a current/flowing in the coils connected to the impedance component.

FIG. 10 shows the relationship between impedance Z of the impedance components Z1–Z7 and the ineffectual current I2 and the effectual current I1 of the coil (i, j).

When the neutral point of the coils is not earthed as in the case of the first to fourth embodiments, the impedance Z of the impedance components Z1–Z7 is equal to an infinite value. In this case, the ineffectual current I2 flowing in the coil is zero and the entire current flowing in the coils becomes the effectual current I1.

On the other hand, when the neutral point is directly earthed, the impedance Z of the impedance components Z1–Z7 is equal to zero. In this case, the ineffectual current I2 as shown in the figure exceeds the effectual current I1.

Thus it is possible to arbitrarily set the ratio of effectual current I1 and the ineffectual current I2 by setting the impedance Z of the impedance components Z1–Z7. Although it is preferred to maximize the impedance Z in terms of energy efficiency, allowing an arbitrary setting of the effectual current I1 and the ineffectual current I2 has the following advantages.

In the motor/generator 10 according to the first to fourth embodiments, the alternating current driving the motor/generator unit 10A is also applied to the motor/generator unit 10B. However the current applied to the coils in the same group of the motor/generator unit 10B is all equiphase.

In this case, the neutral points of the coils are not earthed and not connected with each other.

There is no current to the outside from the neutral points. Thus even when an equiphase alternating current is applied to all the coils of the same group which is connected by a Y connection to the neutral point, there is no current in the coils.

In other words, the alternating current which drives the motor /generator unit 10A does not flow in the coils of the motor/generator unit 10B. In the same manner, the alternating current which drives the motor /generating unit 10B does not flow in the coils of the motor/generator unit 10A.

The composite current which drives the motor/generator units 10A and 10B requires a total potential difference of E1+E2. The potential difference E1 exists between the output terminals of the inverter 32 required to drive the motor/generator unit 10A and the neutral points of the coils of the motor/generator unit 10A. The potential difference E2 exists between the output terminals of the inverter 32 required to drive the motor/generator unit 10B and the neutral points of the coils of the motor/generator unit 10B.

In other words, the potential of the neutral points of the coils of the motor/generator unit 10A is E2 and the potential of the neutral points of the coils of the motor/generator unit 10B is E1. This is equivalent to connecting the coils of the motor/generator unit 10A and the coils of the motor/generator unit 10B in series to the output terminal of the inverter 32.

An induced electromotive force is generated in these coils by the rotation of the motor/generator units 10A and 10B.

The induced electromotive force increases with increases in the rotation speed of the motor/generator units 10A and 10B. When the sum of the induced electromotive force in the motor/generator units 10A and 10B exceeds the voltage of the output terminals of the inverter 32, current does not flow to the motor/generator units 10A and 10B from the inverter 32, and operation of the motor/generator units 10A and 10B is no longer possible.

Figure 11:
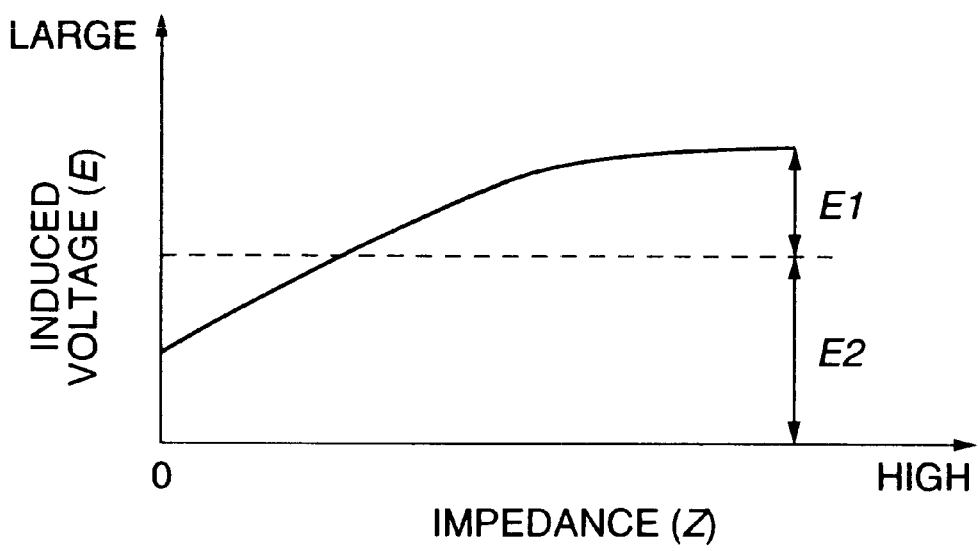
FIG. 11 is a diagram showing a relationship between the impedance Z of the impedance component and an induced voltage E.

It is possible to control the induced electromotive force by earthing the coils of each group of the motor/generator units 10A and 10B through the impedance components Z1–Z7. FIG. 11 shows the relationship of the induced voltage E and the impedance Z of the impedance components Z1–Z7. As clearly shown in the figure, it is possible to prevent the induction voltage E from over-increasing by setting the impedance Z of the impedance components Z1–Z7.

The contents of Tokugan Hei 11-351613 with a filing date of Dec. 10, 1999 in Japan, and Tokugan 2000-358004 with a filing date of Nov. 27, 2000 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A motor/generator comprising a first motor/generator unit comprising a first rotor provided with a magnet and a first stator provided with a plurality of coils facing the first rotor, and a second motor/generator unit comprising a second rotor provided with a magnet and a second stator provided with a plurality of coils facing the second rotor, wherein:

providing that the number of coils in the first stator is S1, the number of pairs of magnetic poles in the magnet of the first rotor is P1, and the number of phases in a first alternating current which drives the first rotor through the coils of the first stator is M1, the coils of the first stator are divided into groups of the number of K1 satisfying the equation K1=S1/M1, the coils in each group of the first stator being mutually connected by any one of a Y connection and a delta connection;

providing that the number of coils in the second stator is S2, the number of pairs of magnetic poles in the magnet of the second rotor is P2, and the number of phases in a second alternating current which drives the second rotor through the coils of the second stator is M2, the coils of the second stator are divided into groups of the number of K2 satisfying the equation K2=S2/M2, the coils in each group of the second stator being mutually connected by any one of a Y connection and a delta connection; and providing that the groups of the first stator is numbered from 1 to K1/A, A being a natural number, the coils in each group of the first stator is numbered from 1 to M1, the groups of the second stator is numbered from 1 to K2/B, B being a natural number, the coils in each group of the second stator is numbered from 1 to M2, and i and j are natural numbers, a coil with a coil number j in a group number i of the first stator and a coil of a coil number i in a group number j of the second stator are connected to each other.

2. The motor/generator as defined in claim 1, wherein a coil with a coil number j in a group number i of the first stator and a coil with a coil number i in a group number j of the second stator are connected in series with an output terminal of an inverter, the inverter having output terminals of the number of $$\frac{K1}{A} \cdot \frac{K2}{B}$$

which output a composite current comprising a first alternating current and a second alternating current with a fixed phase difference.

3. The motor/generator as defined in claim 2, wherein the inverter outputs the composite current comprising a first alternating current having a phase difference of $$360 \cdot \frac{j-1}{M1}$$

degrees with respect to a coil with a coil number 1 in a group number i of the first stator and a second alternating current having a phase difference $$360 \cdot \frac{i-1}{M2}$$

degrees with respect to a coil with a coil number 1 in a group number j of the second stator, to an output terminal of the inverter to which a coil with a coil number j in a group number i of the first stator and a coil with a coil number i in a group number j of the second stator are connected.

4. The motor/generator as defined in claim 1, wherein the coils in each group of the first stator are mutually connected by a Y connection and the coils in each group of the second stator are mutually connected by a Y connection.

5. The motor/generator as defined in claim 3, wherein a neutral point resulting from a Y connection of a coils in each group of the first stator and a neutral point resulting from a Y connection of a coils in each group of the second stator are respectively earthed through an impedance component.

* * * * *